(12) United States Patent
Liu et al.

(10) Patent No.: US 7,565,923 B2
(45) Date of Patent: Jul. 28, 2009

(54) ROTARY TOTAL HEAT EXCHANGE APPARATUS

(75) Inventors: Tay-Jian Liu, Tu-Cheng (TW);
Shu-Cheng Yang, Tu-Cheng (TW);
Chih-Peng Lee, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 426 days.

(21) Appl. No.: 11/211,908

(22) Filed: Aug. 25, 2005

(65) Prior Publication Data

US 2006/0137852 A1 Jun. 29, 2006

(30) Foreign Application Priority Data

Dec. 28, 2004 (TW) .............................. 93140961 A

(51) Int. Cl.
*F28D 19/04* (2006.01)
(52) U.S. Cl. ..................... 165/8; 165/104.21; 165/122
(58) Field of Classification Search ..................... 165/4, 165/8, 9, 57, 97; 62/94
See application file for complete search history.

(56) References Cited

U.S. PATENT DOCUMENTS

| 3,977,466 A | * | 8/1976 | Johansson | .................... 165/285 |
| 4,563,126 A | * | 1/1986 | Kobayashi et al. | .......... 415/119 |
| 4,949,780 A | * | 8/1990 | Chen | ................................ 165/7 |
| 5,069,272 A | * | 12/1991 | Chagnot | .......................... 165/8 |
| 5,183,098 A | * | 2/1993 | Chagnot | .......................... 165/8 |
| 5,372,182 A | * | 12/1994 | Gore | ................................ 165/7 |
| 5,540,274 A | | 7/1996 | Slocum et al. | |
| 5,649,428 A | * | 7/1997 | Calton et al. | .................... 62/94 |
| 6,575,228 B1 | * | 6/2003 | Ragland et al. | ............... 165/54 |
| 2001/0013404 A1 | * | 8/2001 | Lagace et al. | .................. 165/8 |

FOREIGN PATENT DOCUMENTS

| CN | 1321862 A | | 11/2001 |
| CN | 2628927 Y | | 7/2004 |
| JP | 53006951 A | * | 1/1978 |
| TW | 84206249 | | 5/1995 |

\* cited by examiner

*Primary Examiner*—Allen J Flanigan

(57) ABSTRACT

A rotary total heat exchange apparatus includes at least an air-providing member, a first air passage and a second air passage, a sensible heat exchanger (21), and a total heat exchange wheel (1). The air-providing member provides a first airflow from outdoors and a second airflow from indoors into the rotary total heat exchange apparatus. The first and second air passages isolate from each other for guiding the first and second airflows respectively passing through. The sensible heat exchanger spans across the first and second air passages simultaneously for conducting a sensible heat exchange between the first and second airflows. The total heat exchange wheel is capable of rotating through the first and second air passages for conducting a total heat exchange between the first and second airflows.

7 Claims, 7 Drawing Sheets

ROTARY TOTAL HEAT EXCHANGE APPARATUS

TECHNICAL FIELD

The present invention relates generally to a heat exchange apparatus, and more particularly to a rotary total heat exchange apparatus which may suitably be applied to a ventilation system for exchanging sensible and latent heat between airflows having different temperatures and humidities.

BACKGROUND

In our daily life, ventilation systems such as air-conditioners are commonly provided in working or living spaces, e.g., office buildings and apartments, for supplying fresh outdoor air and exhausting polluted indoor air simultaneously in order for keeping a favorable and healthy environment where we stay. Generally, the outdoor air and the indoor air have different temperatures and humidities. In this connection, a significant effect of energy saving could be expected if the exchange between the indoor and outdoor airflows can be achieved not only in heat but also in moisture. In order to satisfy such requirements, total heat exchange apparatuses, which can exchange sensible heat (temperature) and latent heat (moisture) simultaneously without mixing up different types of air, are accordingly developed. Total heat exchange apparatuses are effective in energy saving as they can recover both sensible energy (temperature) and latent energy (moisture) between polluted indoor air and fresh outdoor air.

Referring to FIG. 13, an embodiment of a rotary total heat exchanger for conducting total heat exchange between the indoor air and the outdoor air is shown. The heat exchanger includes a rotary wheel 1 defining a plurality of mini air channels 2 therein, for increasing heat conduct areas thereof. The wheel 1 is covered with heat exchange materials having better heat conductivity and moisture permeability for increasing the heat exchange rate of the wheel 1. The wheel 1 is divided by a plate 5 into two portions separately positioned in an air-outlet housing 3 and an air-inlet housing 4. The wheel 1 is driven to rotate through the air-outlet and air-inlet housings 3, 4 by a driving motor 6, to perform heat exchange between the outdoor and indoor air. The indoor and outdoor air pass through the air channels 2 of the wheel 1 in a counter flow manner. When the wheel 1 rotates beyond 180 degrees, the wheel 1 originally stationed in the air-outlet housing 3 revolves to the air-inlet housing 4, and the wheel 1 originally stationed in the air-inlet housing 4 revolves to the air-outlet housing 3, conducting a total heat exchange of heat and moisture between the indoor air and the outdoor air. With the rotation of the wheel 1 through the air-outlet and air-inlet housings 3, 4, the indoor and outdoor air frequently exchange heat and moisture to ensure that the outdoor fresh air entering in the room has a needed temperature and moisture for satisfying a requirement of the indoor air quality.

Total heat exchange apparatuses are effective in keeping indoor air quality, as well as in energy saving, as is identified above. However, in order to exhibit its full advantages, many improvements still can be made on the design of a total heat exchange apparatus. For example, as far as a rotary total heat exchange apparatus is concerned, the exchange of heat and moisture between different airflows is conducted only in its rotary wheel 1 by resorting to the heat-conductivity and moisture-permeability capabilities of the heat exchange materials of the wheel 1, which results in a limited sensible heat exchange rate as the materials typically have its focus placed on the capability of moisture-permeability rather than heat-conductivity. Also, when the indoor and outdoor air pass through the wheel 1, the mini channels 2 of the wheel 1 may be blocked by dust taken by the air. The blocked mini channels 2 decrease the heat exchange rate of the wheel 1, and furthermore may function as a bed for bacillus to grow, which is harmful to the health of people and reduces the indoor air quality. So the indoor and outdoor air need to be filtrated before entering the mini channels 2 of wheel 1.

Moreover, the supplied air and the exhausted air to be heat-exchanged are typically directed by blowers. The airflows provided by the blowers flow in a direction which does not enable the airflows to flow evenly over mini channels 2 of the wheel 1 in the total heat exchange apparatus. This greatly impairs the total heat exchange efficiency of heat and moisture between the supplied air and the exhausted air.

In view of the above-mentioned problems of the total heat exchange apparatus, there is a need for a total heat exchange apparatus which can improve the sensible heat exchange effect between different airflows conducting heat exchange in the total heat exchange apparatus to increase the indoor air quality, and what is also needed is a total heat exchange apparatus which can distribute the air currents to be heat-exchanged more evenly over the air channels of its total heat exchange member.

SUMMARY

The present invention relates to a rotary total heat exchange apparatus for being typically used in a ventilation system such as an air conditioner. According to embodiments of the present invention, the rotary total heat exchange apparatus includes at least an air-providing member, a first air passage and a second air passage, a sensible heat exchanger, and a total heat exchange wheel. The air-providing member provides a first airflow from outdoors and a second airflow from indoors into the rotary total heat exchange apparatus. The first and second air passages isolate from each other for guiding the first and second airflows respectively passing through. The sensible heat exchanger spans across the first and second air passages simultaneously for conducting a sensible heat exchange between the first and second airflows. The total heat exchange wheel is capable of rotating through the first and second air passages for conducting a total heat exchange between the first and second airflows.

Other advantages and novel features of the present invention will become more apparent from the following detailed description of preferred embodiments when taken in conjunction with the accompanying drawings, in which:

DETAILED DESCRIPTION OF PREFERRED EMBODIMENTS

Figure 1:
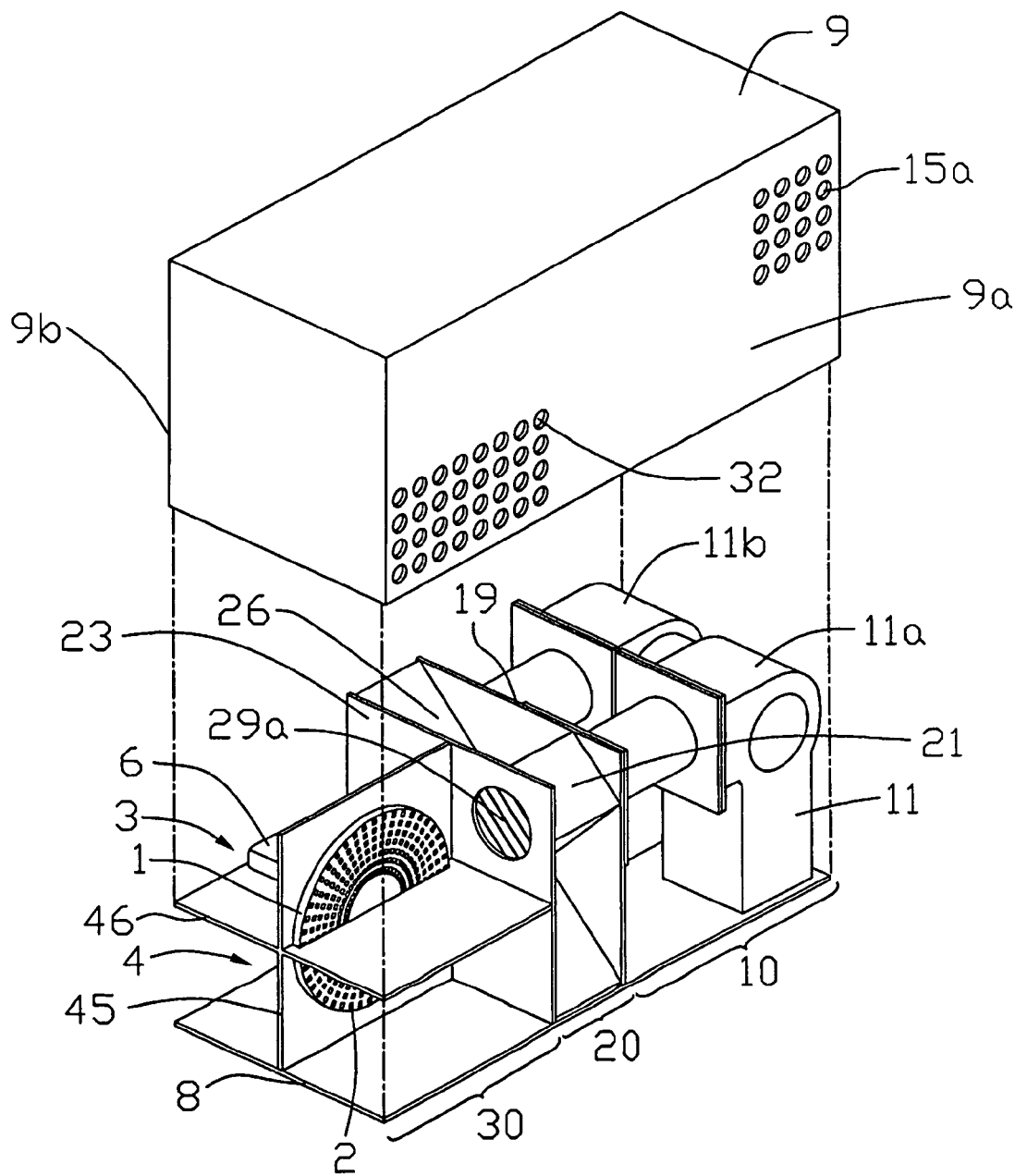
FIG. 1 is an exploded, isometric view of a rotary total heat exchange apparatus in accordance with a preferred embodiment of the present invention.
Figure 2:
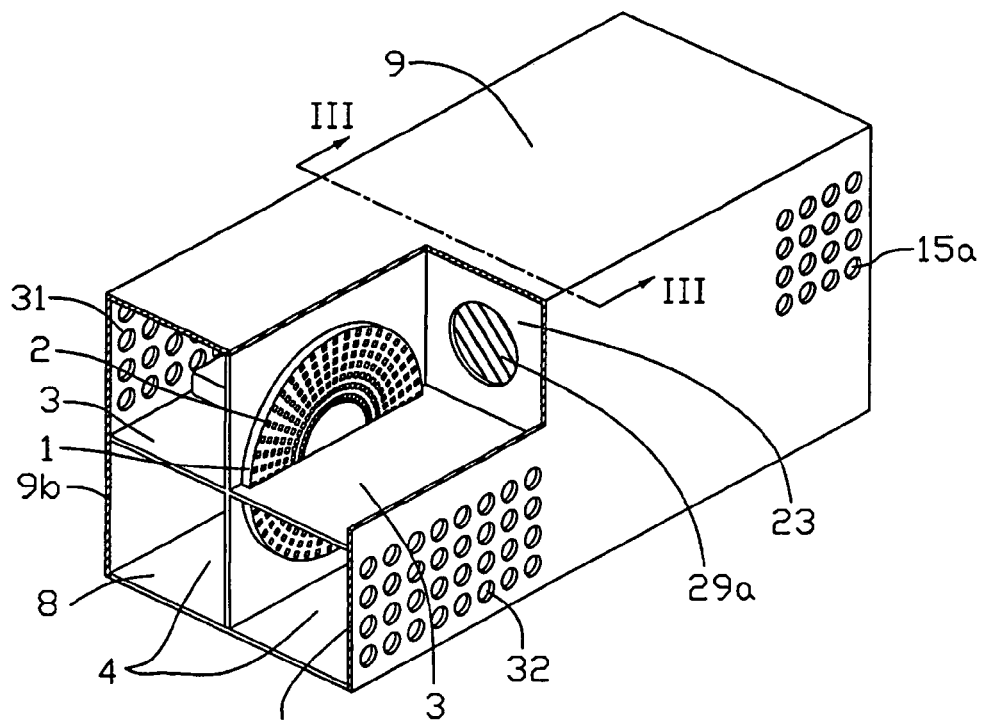
FIG. 2 is an assembled view of FIG. 1, with some parts thereof being cut away for showing more details.

FIGS. 1 and 2 show a total rotary heat exchange apparatus in accordance with a preferred embodiment of the present invention, for exchanging sensible and latent heat between outdoor and indoor airflows having different temperatures and humidities. The rotary total heat exchange apparatus includes a chassis 8, a variety of components attached to the chassis 8, and a cover 9 cooperated with the chassis 8 to form a system enclosure for enclosing the various components therein. The rotary total heat exchange apparatus further includes a first partition plate 19 and a second partition plate 23 perpendicular to the chassis 8, to divide an interior of the system enclosure into three individual parts, i.e., first housing 10, second housing 20 and third housing 30, with each housing containing specific components therein. The rotary total heat exchange apparatus defines a first and a second air passages in the interior of the system enclosure, for guiding the outdoor and indoor airflows passing through the said three housings 10, 20, 30 thereof. A pair of opposite sidewalls 9a, 9b of the cover 9 defines two air inlet openings 15a, 15b (referring to FIG. 7) and two air outlet openings 31, 32 therein corresponding to the two airflows.

Figure 3:
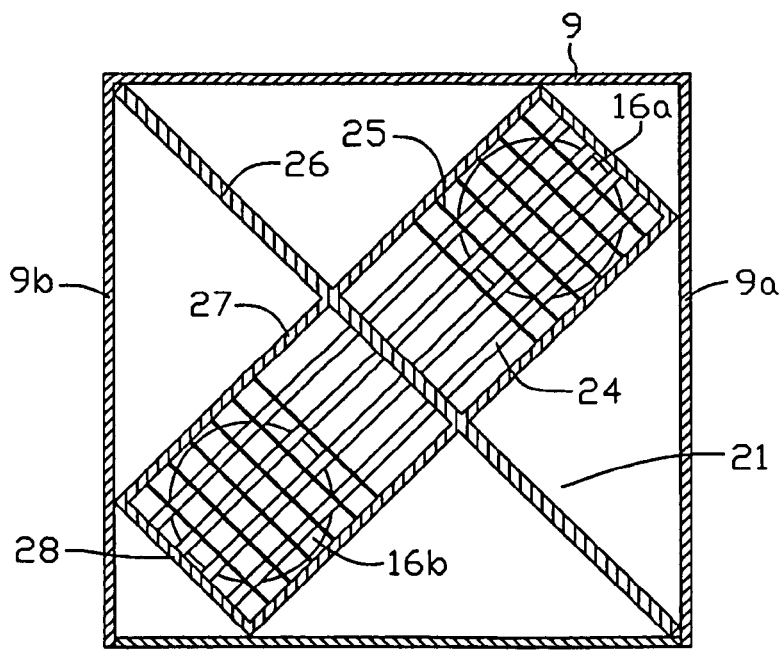
FIG. 3 is an cross sectional view of FIG. 2 taken along lines III-III thereof.

The first housing 10 contains therein an air-providing member such as a blower 11 with a pair of impellers (not visible) for supplying the outdoor and indoor airflows. The blower 11 includes two air-guiding ducts 11a, 11b corresponding to the two impellers respectively. Referring to FIG. 3, the first partition plate 19 defines a first opening 16a at top right corner thereof and a second opening 16b at bottom left corner thereof corresponding to the outlets (not visible) of the air-guiding ducts 11a, 11b respectively. The indoor and outdoor airflows pass through the first and second openings 16a, 16b respectively and enter into the second housing 20 from the first housing 10.

The second housing 20 locates between the first and the third housings 10, 30 and contains therein a sensible heat exchanger 21, which is sandwiched between the first and second partition plates 19, 23 and spans across the first and second openings 16a, 16b for increasing the sensible heat exchange between the outdoor and indoor airflows. Referring to FIG. 3, the sensible heat exchanger 21 includes a plurality of heat transfer elements such as loop heat pipes, and heat pipes 24, and a plurality of spaced cooling fins 25 attached to the heat pipes 24. A dividing member 26 is arranged at a central portion of the sensible heat exchanger 21. When the sensible heat exchanger 21 is positioned in the second housing 20, the dividing member 26 is in airtight abutment with the first and second partition plates 19, 23 to thereby prevent the supplied air (outdoor air) and the exhausted air (indoor air) from mixing up in the second housing 20 when flowing through the sensible heat exchanger 21 to conduct a sensible heat exchange therebetween. The rotary total heat exchange apparatus includes a plurality of sealing pads (not shown) attached to contacting surfaces between the dividing member 26 and the first/second partition plates 19/23, to ensure the airtight abutment therebetween. Preferably, two supporting plates 27 and two fortified plates 28 are respectively attached to distal ends of the fins 25 and the heat pipes 24 for enhancing the integrity of the sensible heat exchanger 21.

The second partition plate 23 also defines a pair of openings 29a, 29b (referring to FIG. 4) aligned with the first and second openings 16a, 16b respectively, for providing communication between the second and third housings 20, 30. The indoor and outdoor airflows pass through the openings 29a, 29b respectively, and enter into the third housing 30 from the second housing 20.

The third housing 30 includes a rotary wheel 1 vertically positioned therein, a driving motor 6 for rotating the wheel 1, and a first and a second spacing plate 45, 46 for dividing the third housing 30 into separated housings. The first and second spacing plates 45, 46 are perpendicular to each other. The wheel 1 is made of aluminum or layered materials such as fiberglass, ceramic fibers, or carbon-fibers, with heat exchange materials of better heat conductivity and moisture permeability covered thereon, to increase the ability of heat exchange thereof. The wheel 1 defines a plurality of mini air channels 2 therein, for increasing the heat exchange areas. The second spacing plate 46 is parallel to the chassis 8 and positioned at a middle portion of the third housing 30, for separating the third housing 30 into an air-outlet housing 3 and an air-inlet housing 4. The first spacing plate 45 is perpendicular to and intersects with the second spacing plate 46 at a middle portion thereof, separately dividing the air-outlet and air-inlet housings 3, 4 into a right portion and a left portion. The first and second spacing plates 45, 46 separately define holes (not labeled) at middle portions thereof for receiving the wheel 1 therein. The wheel 1 is hermetically connected to the first and second spacing plate 45, 46, for preventing the outdoor and indoor airflows in the third housing 30 from being physically mixed. The indoor and outdoor airflows enter into the special portions of the corresponding air-outlet and air-inlet housings 3, 4 of the third housing 30 and pass through the wheel 1 in a counter flow manner to conduct total heat exchange therebetween. Then the indoor airflow leaves the room via the air outlet openings 31 of the cover 9. The outdoor airflow enters the room via the air outlet openings 32 of the cover 9 to increase the quality of air in the room.

In the illustrated embodiment of the present invention, when the blower 11 directs the supplied air from outdoors and the exhausted air from indoors to pass through the sensible heat exchanger 21, a sensible heat exchange is conducted between the supplied air and the exhausted air as they have different temperatures. For example, if in summer, the supplied air generally has a higher temperature than that of the exhausted air. As the supplied and the exhausted air pass through the second housing 20, the heat pipes 24 of the sensible heat exchanger 21 conduct the sensible heat therebetween, to continuously transfer sensible heat from the supplied air to the exhausted air. After being heat-exchanged in the second housing 20, the supplied air and the exhausted air flow into the third housing 30, where a total heat exchange of heat and moisture between them is carried out by flowing through the wheel 1 positioned in the air-outlet and air-inlet housings 3, 4 in a counter-flow manner. Finally, the outdoor fresh air is supplied into indoors via the outlet openings 32 in the sidewall 9a, and the indoor dirty air is exhausted to outdoors via the outlet openings 31 in the sidewall 9b. In this embodiment, the sensible heat exchange between the supplied air and the exhausted air is conducted not only in the wheel 1 but also in the sensible heat exchanger 21. The presence of the sensible heat exchanger 21 greatly increases the sensible heat exchange efficiency between the supplied air and the exhausted air due to its high heat-conductivity. On the other hand, the spaced cooling fins 25 of the sensible heat exchanger 21 can divide the supplied air and the exhausted air into many small flows and guide them into the third housing 30. As a result, the supplied air and the exhausted air are more evenly distributed over the mini channels 42 of the wheel 1. Thus, a better total heat exchange between the supplied air and the exhausted air is obtained by the wheel 1. Preferably, the cover 9 of the rotary total heat exchange apparatus contains dust filters (not shown) respectively at the air inlet openings 15a, 15b and the air outlet openings 31, 32 thereof, for preventing the mini channels 2 of the wheel 1 from being blocked by the dust take by the airflows, to further improve the quality of the indoor air.

Figure 4:
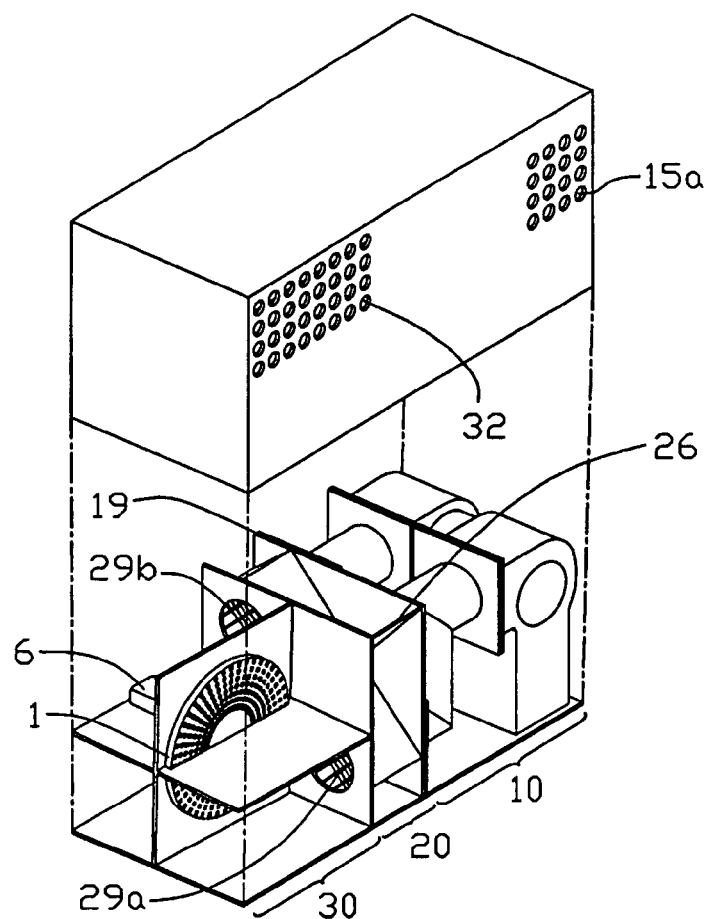
FIG. 4 is an isometric view of a rotary total heat exchange apparatus in accordance with another preferred embodiment of the present invention.
Figure 5:
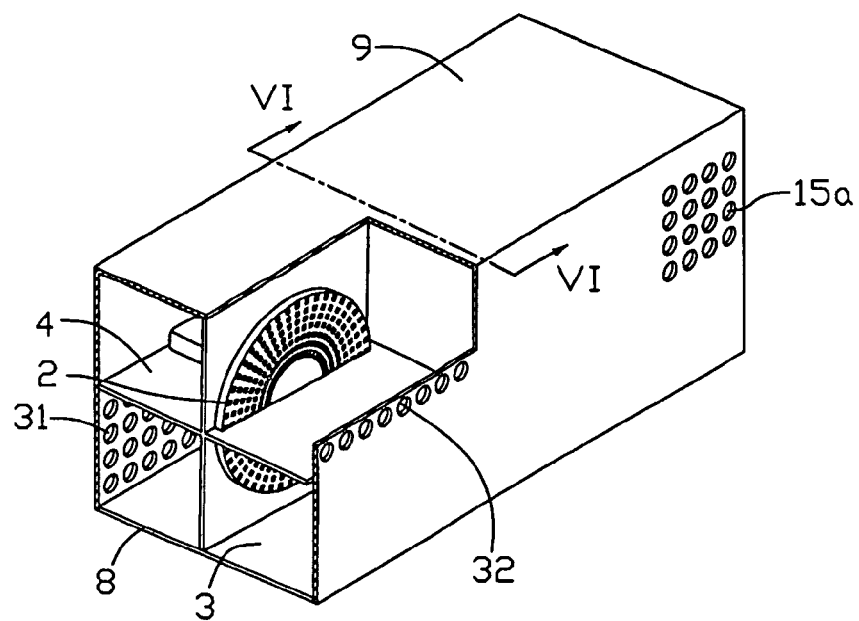
FIG. 5 an assembled view of FIG. 4, with some parts thereof being cut away for showing more details.
Figure 6:
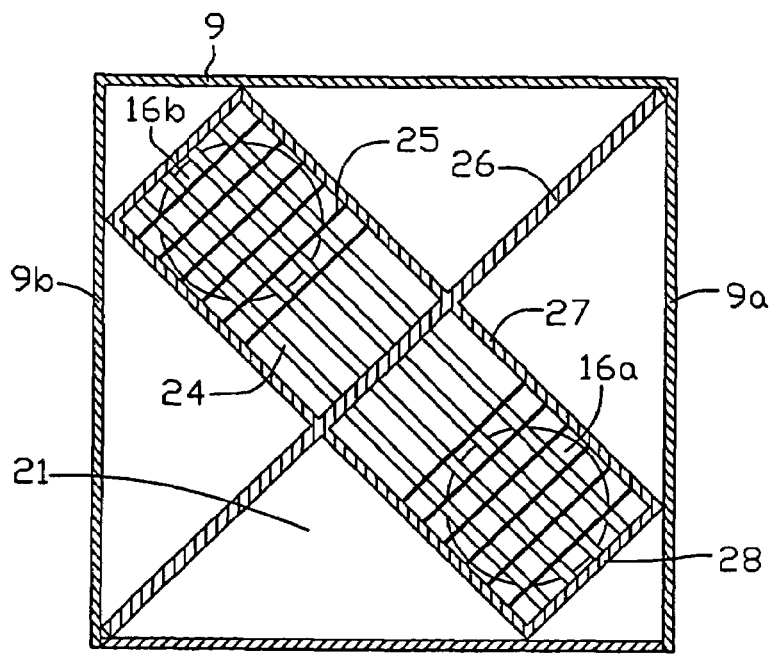
FIG. 6 is an cross sectional view of FIG. 5 taken along lines VI-VI thereof.

FIGS. 4 to 6 show a rotary total heat exchange apparatus in accordance with another preferred embodiment of the present invention. Different from the above-mentioned embodiment, the outlets of the air-guiding ducts 11a, 11b is changed to make the corresponding first and second openings 16a, 16b of the first partition plate 19 defined at top left and bottom right corners thereof respectively. The outdoor and indoor airflows are separately guided to the top left and bottom right corners of the second and third housings 20, 30.

Figure 7:
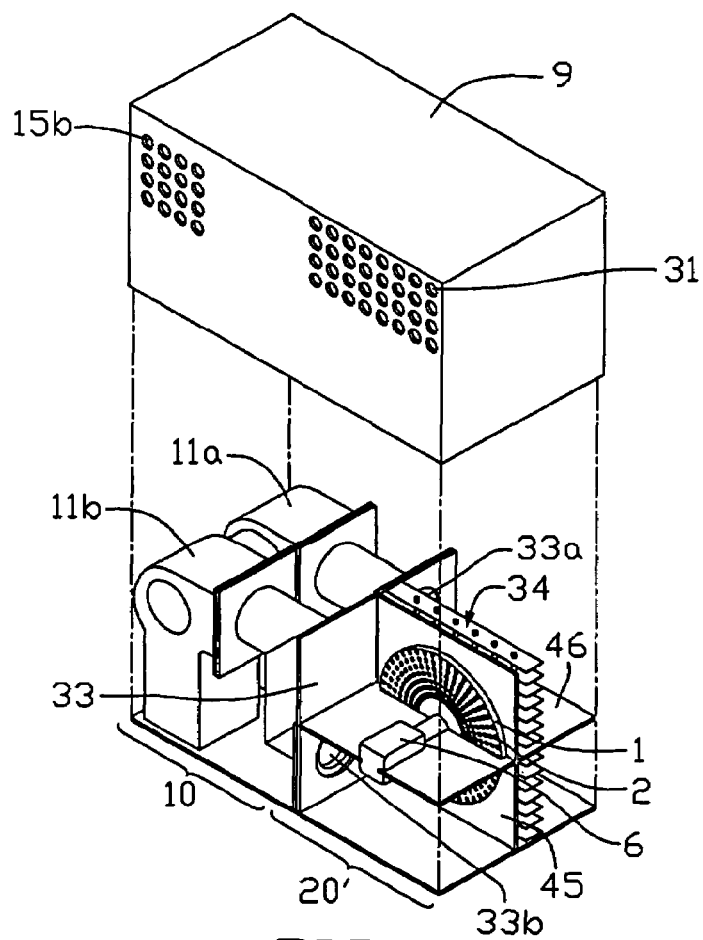
FIG. 7 is an isometric view of a rotary total heat exchange apparatus in accordance with a third preferred embodiment of the present invention.
Figure 8:
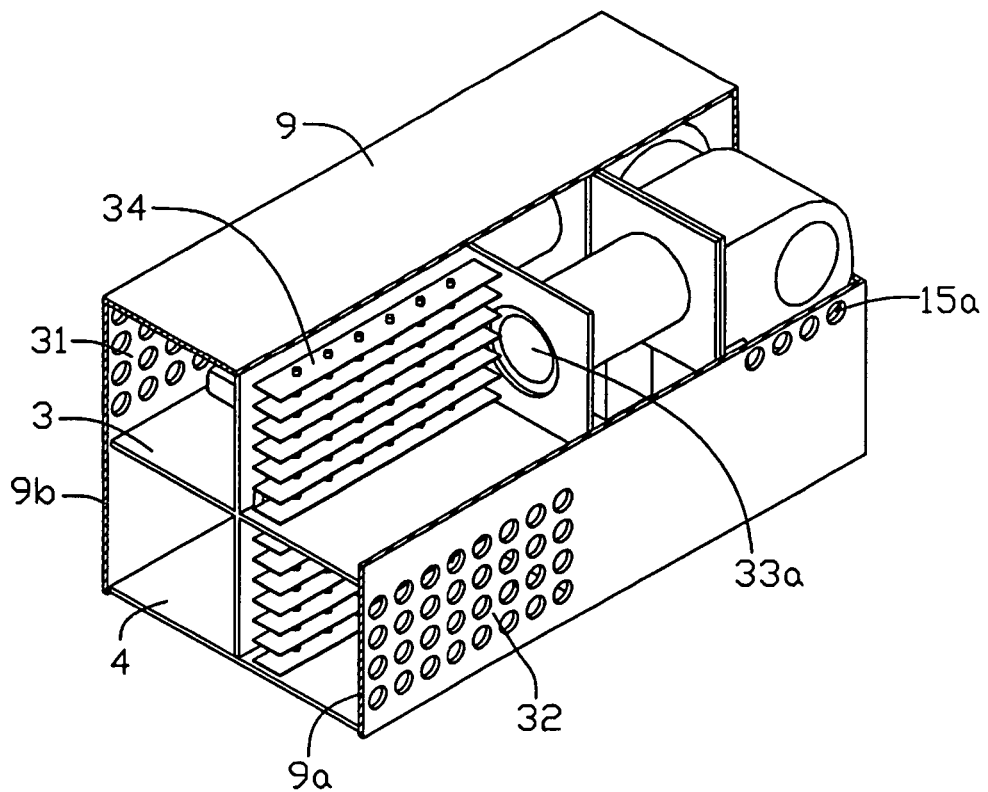
FIG. 8 an assembled view of FIG. 7 viewed from another aspect, with some parts thereof being cut away for showing more details.
Figure 9:
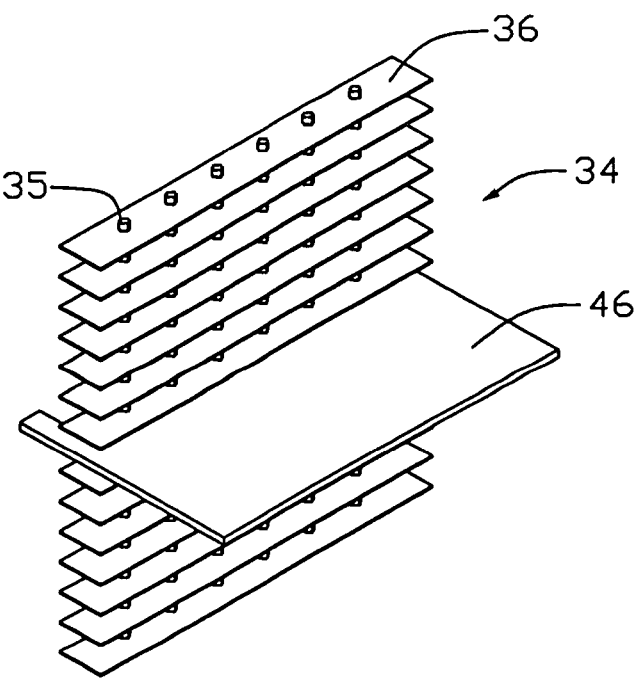
FIG. 9 is an isometric view of a sensible heat exchanger of FIG. 8.

Referring to FIGS. 7 to 9, a rotary total heat exchange apparatus in accordance with a third preferred embodiment of the present invention is shown. The rotary total heat exchange apparatus includes a first housing 10 and a second housing 20' separated from the first housing 10 via a partition plate 33. The partition plate 33 defines therein a pair of openings 33a, 33b for passages of air currents from the first housing 10 to the second housing 20'. The sensible heat exchanger 34 is positioned adjacent to the right side of the wheel 1, with the heat-pipes 35 and the fins 36 located both above and below the second spacing plate 46. The indoor airflow firstly passes through the sensible heat exchanger 34 before it flows through the wheel 1, and conduct heat exchange with the outdoor airflow, which firstly passes through the wheel 1 before flowing through the sensible heat exchanger 34.

Figure 10:
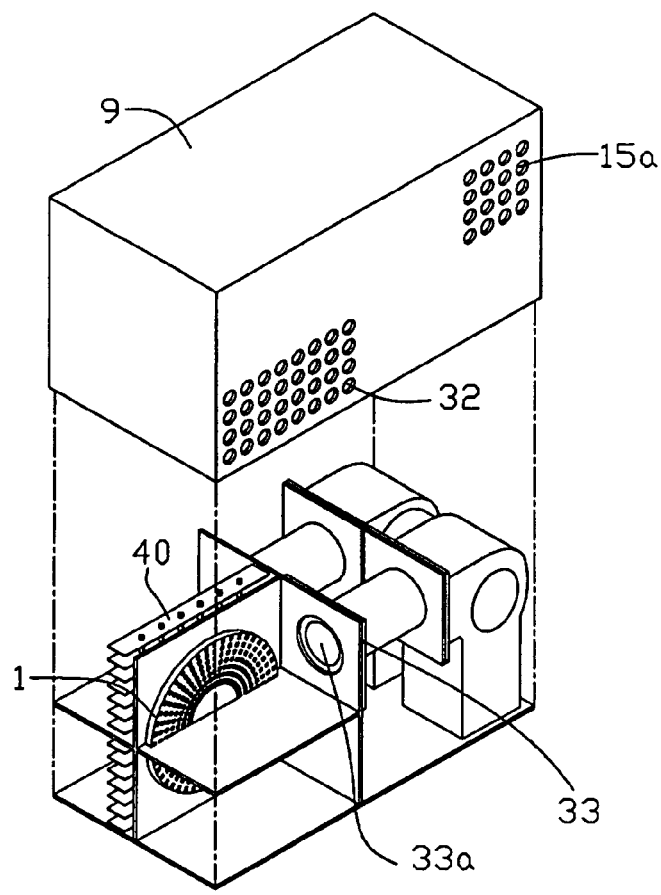
FIG. 10 is an isometric view of a rotary total heat exchange apparatus in accordance with a fourth preferred embodiment of the present invention.
Figure 11:
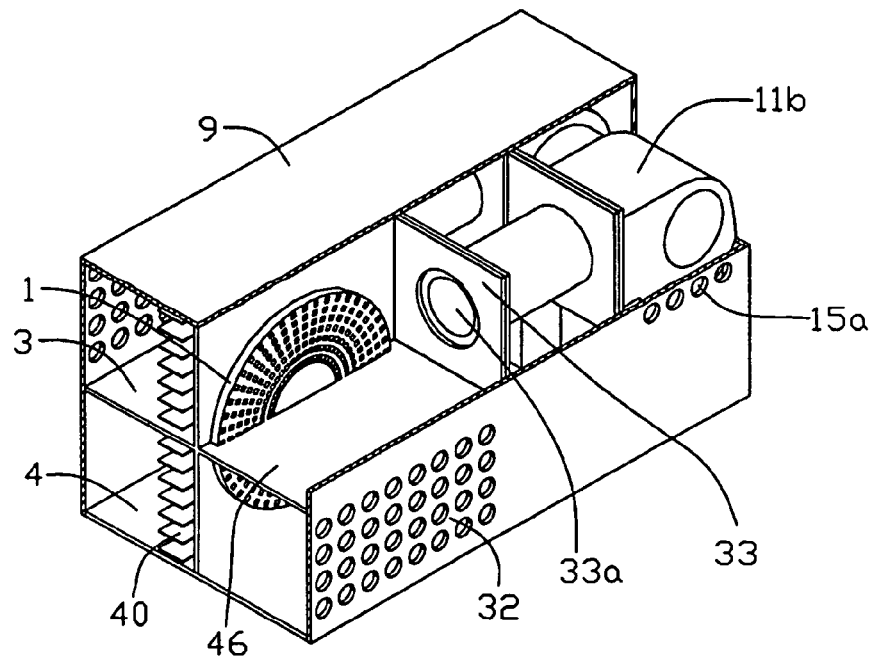
FIG. 11 an assembled view of FIG. 10, with some parts thereof being cut away for showing more details.
Figure 12:
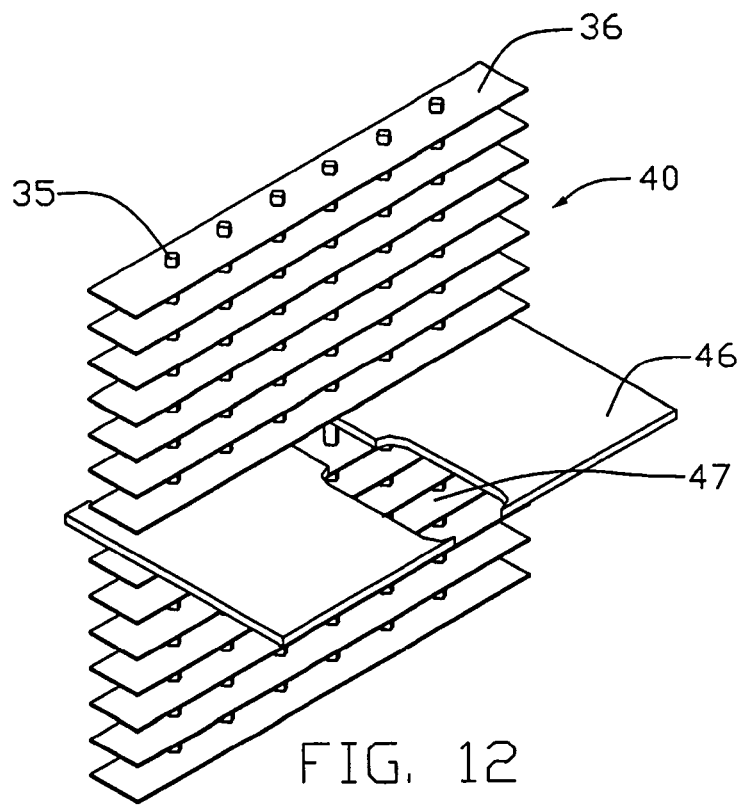
FIG. 12 is an isometric view of a sensible heat exchanger of FIG. 11.
Figure 13:
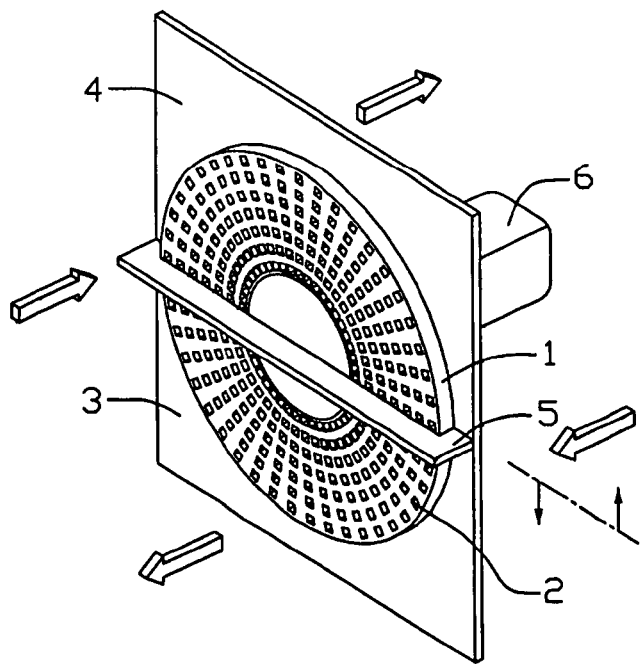
FIG. 13 is an isometric view of a rotary wheel for total heat exchange in accordance with prior art.

FIGS. 10 to 12 show a rotary total heat exchange apparatus in accordance with a fourth preferred embodiment of the present invention. Different from the third embodiment, the sensible heat exchanger 40 is positioned adjacent to the left side of the wheel 1. In this embodiment, the second spacing plate 46 defines an opening 47 at a middle portion of a left side thereof for receiving the driving motor 6 therein. The second spacing plate 46 is hermetically connected with the driving motor 6 to ensure the heat exchange ability of the rotary total heat exchange apparatus.

In the third and fourth embodiment of the present invention, the rotary total heat exchange apparatus may include two sensible heat exchangers separately positioned at left and right sides of the wheel. The wheel can be driven by other mechanism, such as a belt engaging with a shaft of the wheel to drive the wheel to rotate in the air-outlet and air-inlet housings.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rotary total heat exchange apparatus comprising:
   at least an air-providing member for providing a first airflow from outdoors and a second airflow from indoors into the rotary total heat exchange apparatus;
   a first air passage and a second air passage isolating from each other for guiding the first and second airflows respectively passing through;
   a sensible heat exchanger spanning across said first and second airflows simultaneously for conducting a sensible heat exchange between the first and second airflows, wherein the sensible heat exchanger comprises a plurality of heat transfer elements thermally contacting with the first and second airflows and a plurality of spaced cooling fins attached to the heat transfer elements; and
   a total heat exchange wheel rotating through the first and second air passages for conducting a total heat exchange between the first and second airflows, wherein
   the total heat exchange wheel defines a plurality of air channels therein, for increasing heat exchange areas thereof, and wherein
   the rotary total heat exchange apparatus further comprises a system enclosure being divided into a first housing and a second housing by a first partition plate, the first housing contains the air-providing member therein, and the second housing receives the sensible heat exchanger and the total heat exchange wheel therein, the first partition plate diagonally defines a first and a second openings at two opposite corners thereof, the first and the second airflows enter into the second housing from the first housing through the first and the second openings, respectively, and flow through the total heat exchange wheel in a counter flow manner.

2. The rotary total heat exchange apparatus of claim 1, wherein the total heat exchange wheel is arranged perpendicular to the first partition plate.

3. The rotary total heat exchange apparatus of claim 2, the sensible heat exchanger is positioned at one of two sides of the total heat exchange wheel, the first and the second airflows flowing through the sensible heat exchanger in a counter flow manner.

4. The rotary total heat exchange apparatus of claim 2, wherein the second housing is divided into a sensible heat exchange housing and a total heat exchange housing by a second partition plate, the sensible heat exchange housing receiving the sensible heat exchanger therein, the total heat exchange housing receiving the total heat exchange wheel therein, the first and the second airflows flowing through the sensible heat exchanger in the same direction, and entering into the total heat exchange housing through a pair of openings diagonally defined in two opposite corners of the second partition plate.

5. The rotary total heat exchange apparatus of claim 4, wherein the sensible heat exchanger is located between the air-providing member and the total heat exchange wheel.

6. The rotary total heat exchange apparatus of claim 4, wherein the sensible heat exchange housing comprises a dividing member for preventing the first and second airflows from mixing up as the airflows pass through the sensible heat exchanger, the dividing member extending from a corner toward a diagonal corner of the sensible heat exchange housing.

7. A rotary total heat exchange apparatus comprising:
a first housing receiving an airflow generator therein, the airflow generator generating a first airflow flowing from an outdoors to an indoors and a second airflow flowing from the indoors to the outdoors; and
a second housing receiving a first heat exchanger and a second heat exchanger therein, the first heat exchanger conducting a sensible heat exchange between the first airflow and the second airflow, the second heat exchanger conducting simultaneously sensible and latent heat exchange between the first airflow and the second airflow, the second heat exchanger being a rotary heat exchanger, and the first and the second airflows entering into the second housing along a direction parallel to the rotary heat exchanger and leaving the second housing along a direction perpendicular to the rotary heat exchanger, wherein the first airflow and the second airflow have the heat exchange firstly at the first heat exchanger and then at the second heat exchanger, and wherein the first heat exchanger includes at least a heat pipe having a first portion in the first airflow and a second portion in the second airflow.

* * * * *